United States Patent [19]
Teremy

[11] Patent Number: 6,047,138
[45] Date of Patent: Apr. 4, 2000

[54] CAMERA WITH CONTROL TO PREVENT PRE-FLASH LIGHT EMISSION FOR REDUCING RED-EYE EFFECT, WHEN CAMERA-TO-SUBJECT DISTANCE BEYOND RANGE OF PRE-FLASH LIGHT EMISSION

[75] Inventor: Paul Teremy, Rochester, N.Y.

[73] Assignee: Eastman Kodak Company, Rochester, N.Y.

[21] Appl. No.: 09/246,074

[22] Filed: Feb. 5, 1999

[51] Int. Cl.$^7$ ............................................. G03B 15/03
[52] U.S. Cl. ................................. 396/158; 396/157
[58] Field of Search ........................ 396/155, 157, 396/158

[56] References Cited

U.S. PATENT DOCUMENTS

| | | |
|---|---|---|
| 5,153,632 | 10/1992 | Maida et al. ............................ 396/158 |
| 5,233,374 | 8/1993 | Kanai et al. . |
| 5,563,679 | 10/1996 | Dobashi et al. . |
| 5,694,626 | 12/1997 | Goo et al. ............................... 396/158 |
| 5,697,002 | 12/1997 | Kanai et al. . |
| 5,701,519 | 12/1997 | Fukuhara et al. ....................... 396/158 |
| 5,815,749 | 9/1998 | Tsukahara et al. ..................... 396/158 |

*Primary Examiner*—Russell Adams
*Attorney, Agent, or Firm*—Roger A. Fields

[57] ABSTRACT

A camera comprising an electronic flash unit capable of providing a pre-flash light emission for reducing a common phenomenon known as the red-eye effect and a main flash light emission for illuminating a subject during a flash assisted exposure, and a control connected to the electronic flash unit for making a judgement based on the subject brightness and the camera-to-subject distance to cause the electronic flash unit to omit the pre-flash light emission when a flash assisted exposure is to be made, is characterized in that the control is adapted to cause the electronic flash unit to omit the pre-flash light emission when the subject brightness is low enough for the red-eye effect to occur, but the camera-to-subject distance is greater than a maximum distance beyond which the pre-flash light emission is inadequate to reduce the red-eye effect.

7 Claims, 2 Drawing Sheets

CAMERA WITH CONTROL TO PREVENT PRE-FLASH LIGHT EMISSION FOR REDUCING RED-EYE EFFECT, WHEN CAMERA-TO-SUBJECT DISTANCE BEYOND RANGE OF PRE-FLASH LIGHT EMISSION

FIELD OF THE INVENTION

The invention relates generally to the field of photography, and in particular to cameras with electronic flash units that can be operated to provide a pre-flash light emission for reducing or minimizing a common phenomenon known as the red-eye effect and a main flash light emission for illuminating a subject during a flash assisted exposure. More specifically, the invention relates to a camera with a control to prevent the pre-flash light emission when the camera-to-subject distance is beyond the range of the pre-flash light emission to reduce the red-eye effect.

BACKGROUND OF THE INVENTION

When taking a picture using an electronic flash unit and color print film in the camera, an undesirable phenomenon known as the red-eye effect may occur. The red-eye effect is typified by the pupils in the eyes of the person being photographed coming out red-tinted on a color print made from the exposed film. It is attributed to the flash light from the electronic flash unit being reflected by the retinas, through the pupils, of the eyes of the person being photographed. Numerous capillary blood vessels around the retinas are the source of the red tinting of the pupils.

It is known to for the electronic flash unit to provide a brief pre-flash light emission before shutter opening to make an exposure and before the main flash light emission when the shutter is open. The pre-flash light emission is subject-conditioning, as compared to the main flash light emission which illuminates the subject during exposure. The pre-flash light emission causes the pupils in the eyes of the person being photographed to contract, and it precedes the shutter opening and the main flash light emission by a time delay such as 0.35–0.75 seconds. This time delay is sufficient to ensure a substantial reduction in the size (diameter) of the pupils. When the main flash light emission reaches the contracted pupils, less light is able to enter them and the red-eye effect is thereby substantially prevented or minimized.

Prior Art Problem

Usually, the pre-flash light emission to substantially prevent the red-eye effect is provided whenever the electronic flash unit is to be operated to provide a flash assisted exposure of the subject. The disadvantage of this approach is that the battery power supply for the electronic flash unit may not be sufficiently charged both for the pre-flash light emission and for the main flash light emission. The main flash light emission typically is considerably brighter and longer in duration than the pre-flash light emission and therefore requires more power than the pre-flash light emission.

Prior art U.S. Pat. No. 5,697,002 issued Dec. 9, 1997 suggests that the pre-flash light emission be omitted when it is not needed to reduce the red-eye effect. This avoids an otherwise wasteful use of the battery power supply for the electronic flash unit. In the patent, a CPU (central processing unit) judges whether the existing photographic conditions are liable to cause the occurrence of the red-eye effect. This judgement is made on the basis of subject brightness which is derived from a known photometering circuit and on the basis of camera-to-subject distance which is derived from a known rangefinder or focus detection circuit. If the CPU finds three conditions, then the electronic flash unit provides the pre-flash light emission. The first condition is that the exposure to be made is a flash assisted one. The second condition is that the subject brightness is low enough for the red-eye effect to occur. The third condition is that the camera-to-subject distance is great enough to result in an acute angle between respective lines from the taking lens and the flash tube to the subject which is small enough (less than 2.5 degrees) for the red-eye effect to occur. The problem with this approach is that the pre-flash light emission can be provided even though the camera-to subject distance is beyond the range of the pre-flash light emission to reduce the red-eye effect. This is a wasteful use of the battery power supply for the electronic flash unit.

SUMMARY OF THE INVENTION

According to one aspect of the invention, a camera comprising an electronic flash unit capable of providing a pre-flash light emission for reducing a common phenomenon known as the red-eye effect and a main flash light emission for illuminating a subject during a flash assisted exposure, and a control connected to the electronic flash unit for making a judgement based at least on the camera-to-subject distance to cause the electronic flash unit to omit the pre-flash light emission when a flash assisted exposure is to be made, is characterized in that:

the control is adapted to cause the electronic flash unit to omit the pre-flash light emission when the camera-to-subject distance is greater than a maximum distance beyond which the pre-flash light emission is inadequate to reduce the red-eye effect.

According to another aspect of the invention, a method of operating a camera having an electronic flash unit capable of providing a pre-flash light emission for reducing a common phenomenon known as the red-eye effect and a main flash light emission for illuminating a subject during a flash assisted exposure, and a control connected to the electronic flash unit for making a judgement based at least on the camera-to-subject distance to cause the electronic flash unit to omit the pre-flash light emission when a flash assisted exposure is to be made, comprises the steps of:

judging whether the camera-to-subject distance is greater than a maximum distance beyond which the pre-flash light emission is inadequate to reduce the red-eye effect; and omitting the pre-flash light emission when the camera-to-subject distance is judged to be greater than a maximum distance beyond which the pre-flash light emission is inadequate to reduce the red-eye effect.

DETAILED DESCRIPTION OF THE INVENTION

The invention is disclosed as being embodied preferably in a camera with a built-in electronic flash unit such as disclosed in prior art U.S. Pat. No. 5,697,002 issued Dec. 9, 1997. Because the features of a camera with a built-in electronic flash unit are generally known, the description which follows is directed in particular only to those elements forming part of or cooperating directly with the disclosed embodiment. It is to be understood, however, that other elements may take various forms known to a person of ordinary skill in the art.

U.S. Pat. No. 5,697,002 is incorporated in this application.

Figure 1:
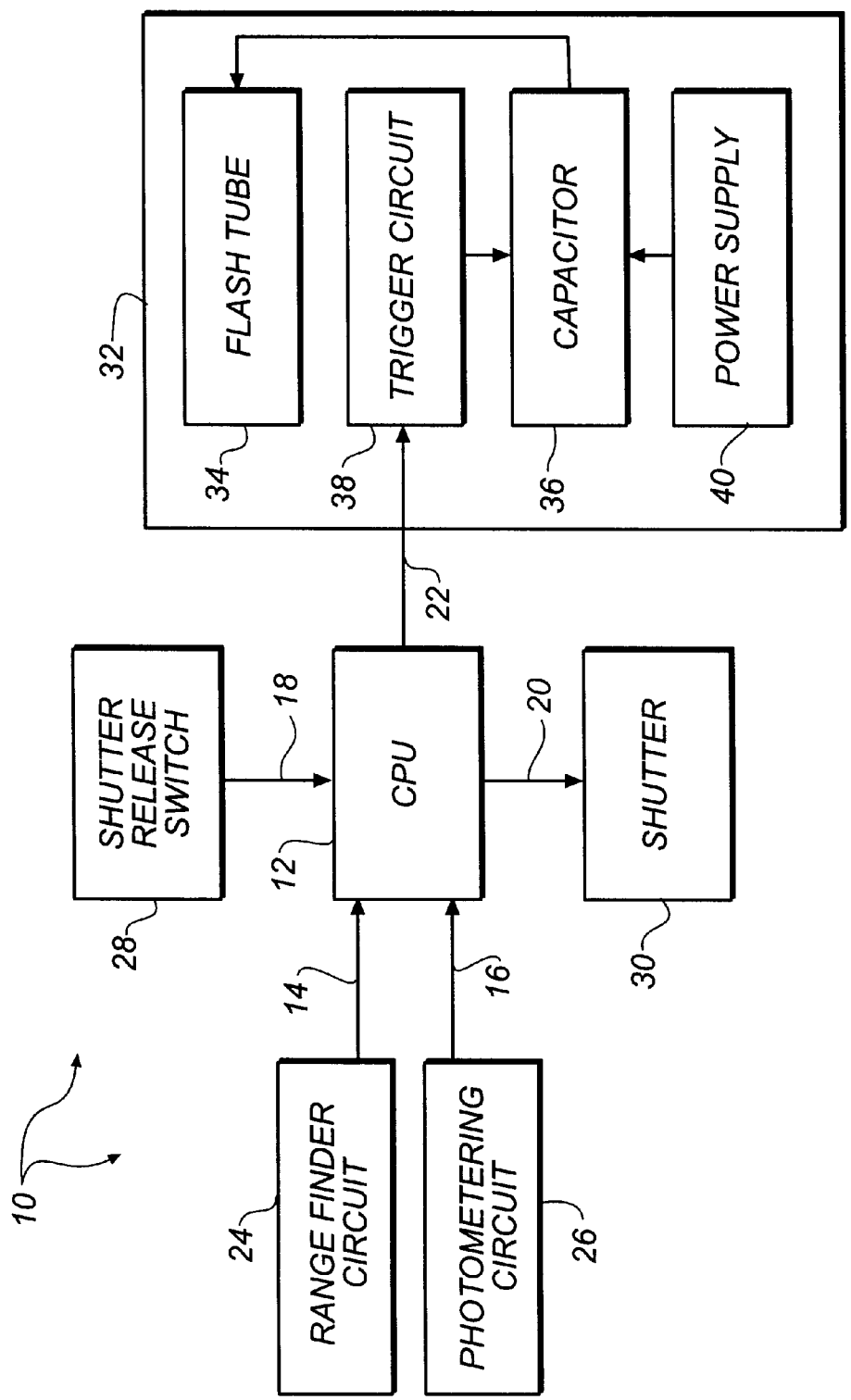
FIG. 1 is a schematic block diagram of a control to prevent a pre-flash light emission for reducing the red-eye effect, whenever the camera-to-subject distance is beyond the range of the pre-flash light emission to reduce the red-eye effect, according to a preferred embodiment of the invention.

Referring now to the drawings, FIG. 1 shows a particular portion of a camera 10 comprising a microcomputer CPU (central processing unit) or controller 12 connected through respective signal transmission lines 14, 16, 18, 20 and 22 to the following known type components: a rangefinder or focus detection circuit 24; a photometering circuit 26; a normally open shutter release switch 28; a shutter 30; and an electronic flash unit 32.

The electronic flash unit 32 unit is the type that is capable of providing both a pre-flash light emission for reducing a common phenomenon known as the red-eye effect and a main flash light emission for illuminating a subject to be photographed. The pre-flash light emission is provided before the shutter 30 is opened to begin a flash assisted exposure and the main flash light emission is provided when the shutter is opened during the flash assisted exposure. As shown in FIG. 1, the electronic flash unit 32 has a flash tube 34, a capacitor 36 connected to the flash tube, a trigger circuit 38 connected to the capacitor and to the CPU 12, and a battery power supply 40 connected to the capacitor. Although the single flash tube 34 and the single capacitor 36 are used to provide both the pre-flash light emission and the main flash light emission, separate pairs of connected flash tubes and capacitors can be provided for the respective functions, such as disclosed in incorporated U.S. Pat. No. 5,697,002. The flash tube 34 is filled with an ionizable gas, and it has an in-line pair of anode and cathode main electrodes at its opposite ends. The anode and cathode electrodes protrude from respective side openings in a flash reflector (not shown) and are connected at respective electrically conductive solder deposits to a pair of identical resilient contacts on a flash circuit board (not shown) which, in turn, are connected to the capacitor 36 on the flash circuit board. The resistance of the gas in the flash tube 34 is normally too high to permit a direct discharge. For firing the flash tube 34, to provide both the pre-flash light emission and the main flash light emission, there is provided a third electrode, i.e. a triggering electrode, for example a triggering wire that is connected rearmost to an outer side of the flash reflector using solder, tape or the like. When the triggering wire applies a triggering voltage to the flash reflector, the gas in the flash tube 34 is ionized, thus lowering its resistance and allowing the capacitor 36 to discharge its stored energy through the flash tube in the form of a flash of light.

The normally open shutter release switch 28 is operatively associated with a shutter release button (not shown) which is manually depressed to initiate both a flash assisted and daylight exposure. When the shutter release button is depressed, the shutter release switch 28 is closed and a switch closed signal indicating the switch is closed is inputted to the CPU 12 via the signal transmission line 18.

The rangefinder or focus detection circuit 24 is the same as in incorporated U.S. Pat. No. 5,697,002 and it is intended to input a focus detection signal via the input transmission line 14 to the CPU 12 when the shutter release switch 28 is closed. As in the patent, the focus detection signal enables the CPU 12 to determine the distance between the camera 10 and the subject to be photographed.

The photometering circuit 26 is the same as in incorporated U.S. Pat. No. 5,697,002 and it is intended to input photometric data via the input transmission line 16 to the CPU 12 when the shutter release switch 28 is closed. As in the patent, the photometric data enables the CPU 12 to determine the subject brightness, i.e. the brightness of ambient light reflected from the subject.

Operation

Figure 2:
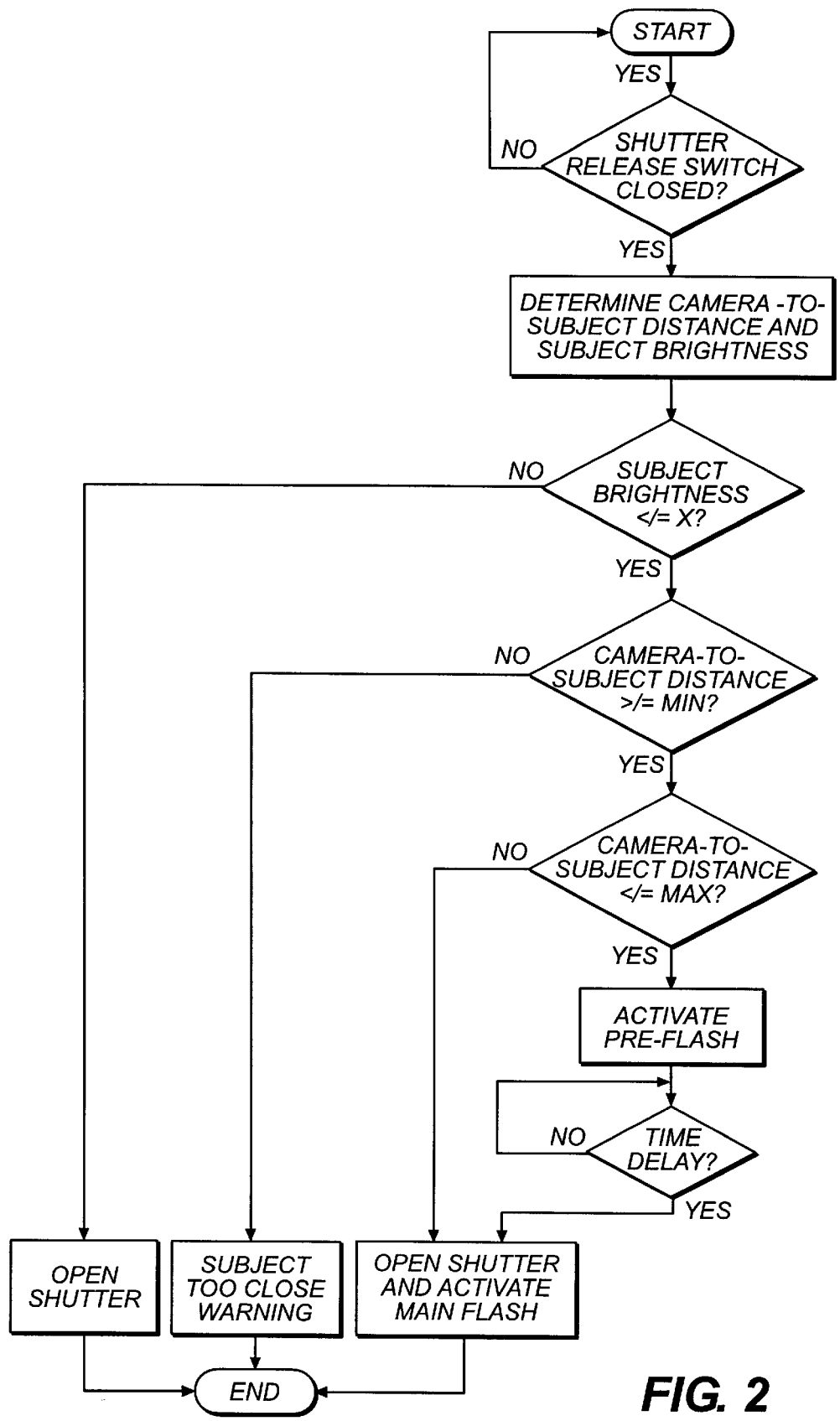
FIG. 2 is a flow diagram depicting operation of the control shown in FIG. 1.

Turning now to FIG. 2, there is depicted a flow chart showing a routine for the electronic flash unit 32 to omit the pre-flash light emission for reducing the red-eye effect when the camera-to-subject distance is beyond the range of the pre-flash light emission to reduce the red-eye effect.

When the shutter release button is manually depressed to close the shutter release switch 28, a closed switch signal indicating the switch is closed is inputted to the CPU 12 via the signal transmission line 18. The CPU 12 then activates the rangefinder or focus detection circuit 24 and the photometering circuit 26.

The rangefinder or focus detection circuit 24 then inputs a focus detection signal via the input transmission line 14 to the CPU 12 to enable the CPU 12 to determine the distance between the camera 10 and the subject to be photographed, and the photometering circuit 26 inputs photometric data via the input transmission line 16 to the CPU 12 to enable the CPU 12 to determine the subject brightness.

The CPU 12 then executes a judgement as to whether the determined subject brightness is low enough for the red-eye effect to occur. This is done by the CPU judging whether the determined subject brightness is at or below a threshold brightness value at which the red-eye effect is liable to begin to occur (or conversely, is above that value).

When the answer is "No", a daylight exposure is commenced by the CPU 12 outputting a shutter open signal via the signal transmission line 20 to the shutter 30. The shutter 30 then opens and re-closes to begin and end the daylight exposure.

When the answer is "Yes", the CPU 12 then executes a judgement as to whether the camera 10 is too close to the subject to obtain an in-focus exposure (rather than an out-of-focus exposure). This is done by the CPU 12 judging whether the determined camera-to-subject distance is equal to or greater than a minimum or threshold distance at which an in-focus exposure can begin to be obtained (or conversely, is less than the minimum distance).

When the answer is "No", the CPU 12 outputs a warning signal via a signal transmission line to a visual indicator (not shown) to cause the indicator to display a "SUBJECT TO CLOSE" warning.

When the answer is "Yes", the CPU 12 then executes a judgement as to whether the determined camera-to-subject distance is greater than a maximum distance beyond which the pre-flash light emission is inadequate to reduce the red-eye effect. This is done by the CPU 12 judging whether the determined camera-to-subject distance is less than or equal to the maximum distance (or conversely, is above the maximum distance).

When the answer is "No", a flash assisted exposure is commenced by the CPU 12 outputting a shutter open signal via the signal transmission line 20 to the shutter 30 to begin shutter opening, and inputting a main flash signal via the signal transmission line 22 to the trigger circuit 38. As a result, the pre-flash light emission for reducing the red-eye effect is not provided before the shutter 30 is opened, and only the main flash light emission for illuminating the subject during the flash assisted exposure is provided when the shutter 30 is open.

When the answer is "Yes", the CPU 12 outputs a pre-flash signal via the signal transmission line 22 to the trigger circuit 38 to provide the pre-flash light emission for reducing the red-eye effect before the shutter 30 is opened. Then, after an appropriate time delay sufficient to ensure a substantial reduction in the size of pupils in the eyes of the person being photographed, the CPU 12 outputs a shutter open signal via the signal transmission line 20 to the shutter 30 to begin shutter opening, and inputs a main flash signal via the signal transmission line 22 to the trigger circuit 38 to provide a main flash light transmission when the shutter is open.

EXAMPLES

For ISO 100 film, a taking lens focal length of 50 mm, an exposure aperture of f/5.6, and a flash Guide No. of 32 (which is reduced to 26 when there is a pre-flash light emission before the main flash light emission), in one example in which the subject brightness was 80 foot-lamberts the pre-flash light emission was provided only when the subject distance was between 2.3 feet and 9.3 feet. In a second example for ISO 200 film, the subject brightness was 40 foot-lamberts and the pre-flash light emission was provided only when the subject distance was between 3.3 feet and 13.0 feet. In a third example for ISO 400 film, the subject brightness was 20 foot-lamberts and the pre-flash light emission was provided only when the subject distance was between 4.6 feet and 18.6 feet.

The invention has been described with reference to a preferred embodiment. However, it will be appreciated that variations and modifications can be effected by a person of ordinary skill in the art without departing from the scope of the invention. For example, the flow diagram in FIG. 2 could be modified to prevent the main flash light emission when the camera-to-subject distance is beyond the range of the main flash light emission to illuminate the subject.

What is claimed is:

1. A camera comprising an electronic flash unit capable of providing a pre-flash light emission for reducing a common phenomenon known as the red-eye effect and a main flash light emission for illuminating a subject during a flash assisted exposure, and a control connected to said electronic flash unit for making a judgement based at least on the camera-to-subject distance to cause said electronic flash unit to omit the pre-flash light emission when a flash assisted exposure is to be made, is characterized in that:

said control is adapted to cause said electronic flash unit to omit the pre-flash light emission when the camera-to-subject distance is greater than a maximum distance beyond which the pre-flash light emission is inadequate to reduce the red-eye effect.

2. A camera as recited in claim 1, wherein said control is adapted to cause said electronic flash unit to provide the main flash light emission even though the pre-flash light emission is omitted.

3. A camera comprising an electronic flash unit capable of providing a pre-flash light emission for reducing a common phenomenon known as the red-eye effect and a main flash light emission for illuminating a subject during a flash assisted exposure, and a control connected to said electronic flash unit for making a judgement based on the subject brightness and the camera-to-subject distance to cause said electronic flash unit to omit the pre-flash light emission when a flash assisted exposure is to be made, is characterized in that:

said control is adapted to cause said electronic flash unit to omit the pre-flash light emission when the subject brightness is low enough for the red-eye effect to occur, but the camera-to-subject distance is greater than a maximum distance beyond which the pre-flash light emission is inadequate to reduce the red-eye effect.

4. A method of operating a camera having an electronic flash unit capable of providing a pre-flash light emission for reducing a common phenomenon known as the red-eye effect and a main flash light emission for illuminating a subject during a flash assisted exposure, and a control connected to the electronic flash unit for making a judgement based at least on the camera-to-subject distance to cause the electronic flash unit to omit the pre-flash light emission when a flash assisted exposure is to be made, said method comprising the steps of:

judging whether the camera-to-subject distance is greater than a maximum distance beyond which the pre-flash light emission is inadequate to reduce the red-eye effect; and omitting the pre-flash light emission when the camera-to-subject distance is judged to be greater than a maximum distance beyond which the pre-flash light emission is inadequate to reduce the red-eye effect.

5. A method of operating a camera having an electronic flash unit capable of providing a pre-flash light emission for reducing a common phenomenon known as the red-eye effect and a main flash light emission for illuminating a subject during a flash assisted exposure, and a control connected to the electronic flash unit for making a judgement based on the subject brightness and the camera-to-subject distance to cause the electronic flash unit to omit the pre-flash light emission when a flash assisted exposure is to be made, said method comprising the steps of:

judging whether the subject brightness is low enough for the red-eye effect to occur;

judging whether the camera-to-subject distance is greater than a maximum distance beyond which the pre-flash light emission is inadequate to reduce the red-eye effect; and omitting the pre-flash light emission when the subject brightness is judged to be low enough for the red-eye effect to occur, but the camera-to-subject distance is judged to be greater than a maximum distance beyond which the pre-flash light emission is inadequate to reduce the red-eye effect.

6. A method as recited in claim 5, comprising the further step of:

providing the main flash light emission whenever the subject brightness is judged to be low enough for the red-eye effect to occur.

7. A method of operating a camera having an electronic flash unit capable of providing a pre-flash light emission for reducing a common phenomenon known as the red-eye effect and a main flash light emission for illuminating a subject during a flash assisted exposure, and a control connected to the electronic flash unit for making a judge ment based on the subject brightness and the camera-to-subject distance to cause the electronic flash unit to omit the pre-flash light emission when a flash assisted exposure is to be made, said method comprising the steps of:

determining the subject brightness;

determining the camera-to-subject distance;

judging whether the subject brightness is low enough for the red-eye effect to occur;

judging whether the camera-to-subject distance is greater than a maximum distance beyond which the pre-flash light emission is inadequate to reduce the red-eye effect;

omitting the pre-flash light emission when the subject brightness is judged to be low enough for the red-eye effect to occur, but the camera-to-subject distance is judged to be greater than a maximum distance beyond which the pre-flash light emission is inadequate to reduce the red-eye effect; and providing the main flash light emission whenever the subject brightness is judged to be low enough for the red-eye effect to occur.

* * * * *